United States Patent
Watanabe et al.

(10) Patent No.: US 7,688,221 B2
(45) Date of Patent: Mar. 30, 2010

(54) DRIVING SUPPORT APPARATUS

(75) Inventors: Takashi Watanabe, Utsunomiya (JP); Kei Oshida, Utsunomiya (JP); Yoichi Sugimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 11/821,691

(22) Filed: Jun. 25, 2007

(65) Prior Publication Data
US 2008/0007428 A1 Jan. 10, 2008

(30) Foreign Application Priority Data
Jul. 5, 2006 (JP) .............................. 2006-185715

(51) Int. Cl.
*G08G 1/00* (2006.01)
*B60Q 1/00* (2006.01)
*H04N 7/18* (2006.01)

(52) U.S. Cl. ................ 340/901; 340/903; 340/937; 340/425.5; 340/435; 348/118; 348/135; 348/148; 180/167

(58) Field of Classification Search ......... 340/901, 340/903, 425.5
See application file for complete search history.

(56) References Cited

U.S. PATENT DOCUMENTS 6,593,960 B1 * 7/2003 Sugimoto et al. ........... 348/148
6,756,888 B2 * 6/2004 Su et al. ..................... 340/436

FOREIGN PATENT DOCUMENTS

JP 09-071198 3/1997

* cited by examiner

*Primary Examiner*—Donnie L Crosland
(74) *Attorney, Agent, or Firm*—Carrier, Blackman & Associates P.C.; Joseph P. Carrier; William D. Blackman

(57) ABSTRACT

A driving support apparatus includes: an image sensing device that photographs side region of a vehicle and rearward region of a vehicle while altering an angle of view; a display unit that displays video images photographed by the image sensing device so as to be visible to a driver of the vehicle; a display determination device that determines a running state of the vehicle, and determines whether or not an alteration of the display angle of view is required; and an angle of view adjustment device that switches the angle of view of the image sensing device, in accordance with a display method decided by the display determination device, between either one of a wide angle that enables the side region and the rearward region to be photographed, and a narrow angle that only allows the rearward region to be photographed.

16 Claims, 6 Drawing Sheets

120°: WIDE ANGLE VIDEO IMAGE
DURING A LEFT OR RIGHT TURN

60°: NARROW ANGLE VIDEO IMAGE
DURING A LANE CHANGE

DRIVING SUPPORT APPARATUS

BACKGROUND OF THE INVENTION

Priority is claimed on Japanese Patent Application No. 2006-185715, filed Jul. 5, 2006, the content of which is incorporated herein by reference.

FIELD OF THE INVENTION

The present invention relates to a driving support apparatus.

DESCRIPTION OF RELATED ART

Conventionally, an apparatus is known, that displays on a monitor video image data obtained by photographing rearward region of a vehicle using a camera (see, for example, Japanese Unexamined Patent Application, First Publication No. H09-71198).

In the aforementioned conventional apparatus, because video image data of a predetermined photographic subject area is simply displayed on a monitor, if the quantity of information and the information contents required by the driver change in accordance with the running state of the vehicle, then it is difficult for the proper information to be provided.

The present invention was conceived in view of the above-described circumstances, and has an object of providing a driving support apparatus that makes it possible to provide suitable external information that is required by a driver in accordance with the running state of a vehicle.

SUMMARY OF THE INVENTION

In order to solve the above-described problems, the present invention employs the followings.

Namely, a driving support apparatus includes: an image sensing device that photographs side region of a vehicle and rearward region of a vehicle while altering an angle of view; a display unit that displays video images photographed by the image sensing device so as to be visible to a driver of the vehicle; a display determination device that determines a running state of the vehicle, and determines whether or not an alteration of the display angle of view is required; and an angle of view adjustment device that switches the angle of view of the image sensing device, in accordance with a display method decided by the display determination device, between either one of a wide angle that enables the side region and the rearward region to be photographed, and a narrow angle that only allows the rearward region to be photographed.

According to the above-described driving support apparatus, because it is possible to photograph side region of a present vehicle and rearward region of a present vehicle while altering an angle of view in accordance with the running state of the present vehicle, it is possible to set the quantity of external information that is required for a driving operation at a suitable quantity, and it is possible, for example, to prevent superfluous information being supplied unnecessarily, and prevent necessary information to be insufficient.

It may be arranged such that the display determination device determines the running state based on the degree of a turn of the vehicle, that is predicted or detected, and the angle of view adjustment device sets the angle of view to a wide angle when the degree of the turn is determined by the display determination device to be large.

In this case, by changing the angle of view of the image sensing device to a wide angle so as to photograph side region of and rearward region of a vehicle when the degree of a turn of a present vehicle is predicted or detected to be large, external information in a dead angle for a driver can also be suitably provided.

It may be arranged such that the display determination device determines the running state based on the degree of a turn of the vehicle, that is predicted or detected, and the angle of view adjustment device sets the angle of view to a narrow angle when the degree of the turn is determined by the display determination device to be small.

In this case, by changing the angle of view of the image sensing device to a narrow angle so as to only photograph rearward region of a vehicle when the degree of a turn of a present vehicle is predicted or detected to be small, it is possible to prevent superfluous external information being supplied unnecessarily to a driver.

It may be arranged such that the display determination device determines that the degree of the turn is large when a left or right turn or a U-turn of the vehicle is predicted or detected.

In this case, by determining that the degree of a turn of the present vehicle is large when a left or right turn or a U-turn made by the present vehicle is predicted or detected, the running state of the present vehicle can be suitably determined.

It may be arranged such that the display determination device determines that the degree of the turn is small when a lane change or fork or merge of the vehicle is predicted or detected.

In this case, by determining that the degree of a turn of the present vehicle is small when a lane change or fork or merge of the present vehicle is predicted or detected, the running state of the present vehicle can be suitably determined.

The driving support apparatus may further include a speed measuring device that measures a speed of the vehicle, wherein the display determination device determines the running state based on the speed that is measured by the speed measuring device.

In this case, the running state can be suitably determined based on the speed of the present vehicle.

It may be arranged such that the angle of view adjustment device sets the angle of view to the wide angle when the speed is less than a predetermined speed.

In this case, by changing the angle of view of the image sensing device to a wide angle when the speed of the present vehicle is less than a predetermined speed, external information in a dead angle of a driver can be suitably provided.

It may be arranged such that the angle of view adjustment device sets the angle of view to the narrow angle when the speed is greater than a predetermined speed.

In this case, by changing the angle of view of the image sensing device to a narrow angle when the speed of the present vehicle is greater than a predetermined speed, it is possible to prevent superfluous external information being supplied unnecessarily to a driver.

The driving support apparatus may further include road map data; and a route setting device that sets a route of the vehicle based on the road map data, wherein the display determination device determines the running state based on the route that is set by the route setting device.

In this case, the running state can be suitably determined based on the route of the present vehicle.

The driving support apparatus may further include an intention prediction device that predicts a driving intention of the driver of the vehicle, wherein the display determination device determines the running state based on the driving intention that is predicted by the intention prediction device.

In this case, the running state can be suitably determined based on the driving intention of the driver of the present vehicle.

The driving support apparatus may further include an object detection device that detects an object that has a possibility of coming into contact with the vehicle in the video images photographed by the image sensing device, wherein the display unit provides a display that enables the visibility of the object detected by the object detecting device to be improved.

In this case, by displaying a detected object in order to improve the visibility of the detected object, when an object that has a possibility of coming into contact with a present vehicle is detected in the side region of or in the rearward region of the present vehicle, an object that is present in the side region of or in the rearward region of the vehicle can be made suitably visible to a driver.

It may be arranged such that the display unit improves the visibility of the object by performing at least one of an enlarged display, a highlighted display, and a display in the center of the display unit, of the object.

In this case, by performing at least one of an enlarged display, a highlighted display, and a display in the center of the display unit, of an object, it is possible to improve the visibility of the object and an object that is present in side region of or in rearward region of a vehicle can be made suitably visible to a driver.

DETAILED DESCRIPTION OF THE INVENTION

A driving support apparatus according to an embodiment of the present invention will now be described below with reference to the drawings.

Figure 1:
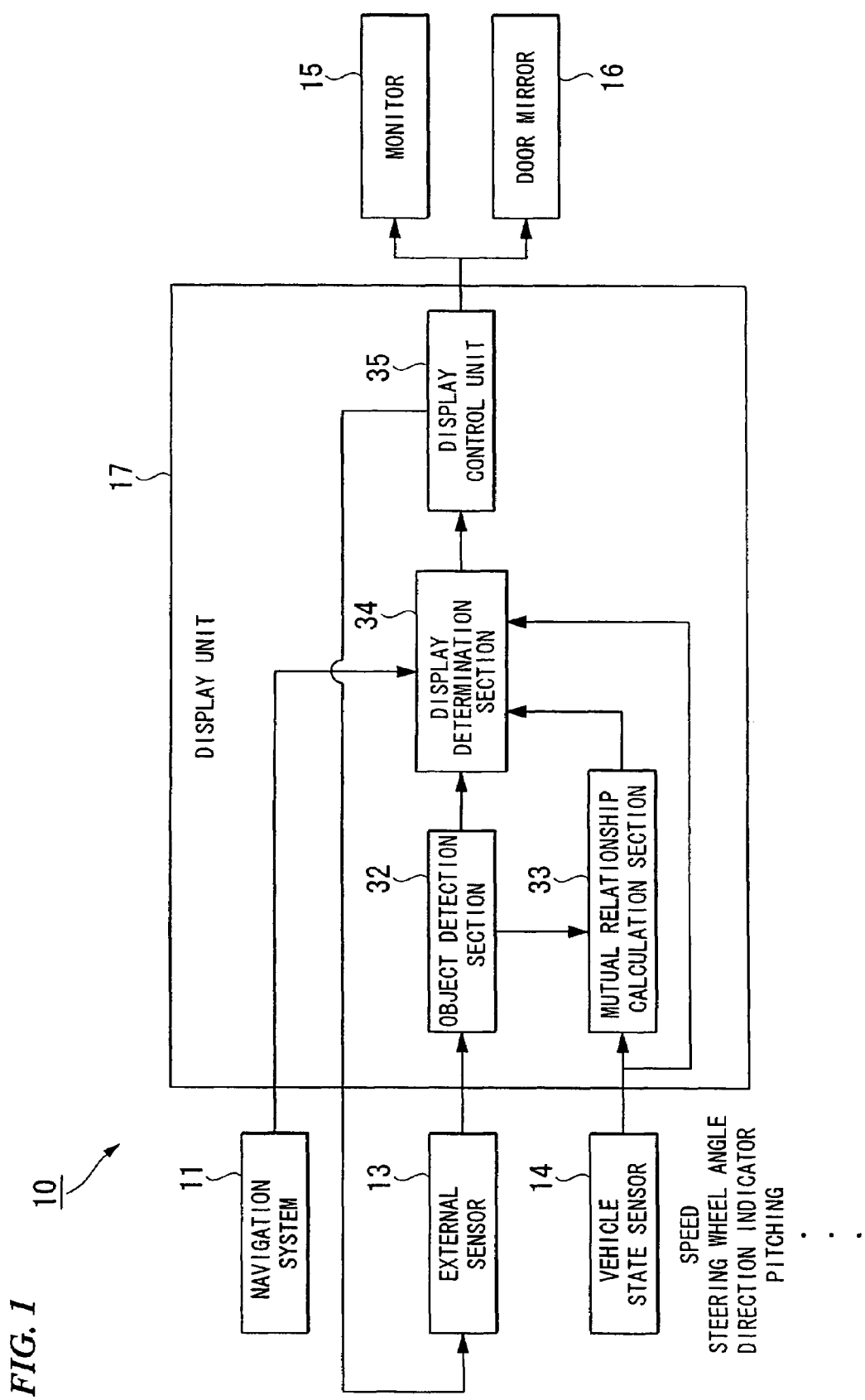
FIG. 1 is a structural view of a driving support apparatus according to an embodiment of the present invention.

As is shown, for example, in FIG. 1, a driving support apparatus 10 according to the present embodiment includes a navigation system 11 (route setting device), an external sensor 13 (image sensing device), a vehicle state sensor 14 (speed measuring device), a monitor 15 (display unit), a door mirror 16, and a display unit 17.

The navigation system 11 determines the current position and traveling direction of a present vehicle based on measured results of positioning signals such as GPS (global positioning system) signals that are used to measure the position of a vehicle using artificial satellites, or based on various measured results from a gyro sensor and an acceleration sensor that are installed in the vehicle state sensor 14. In addition, based on the results of such determinations, the navigation system 11 performs map matching processing on map data stored in a map data storage device so as to enable it to control the position displayed as the current position of the vehicle on a display screen, and to control map-displays on a display screen of the detected current position of the vehicle or of an appropriate vehicle position input by an operator via some type of switch or keyboard or the like.

The map data storage device installed in the navigation system 11 is provided with map data in the form of data needed for processing such as route searching and route guidance (for example, various data such as nodes which are points composed of the latitude and longitude of predetermined positions such as intersection points and the like, and links which are lines connecting the respective nodes) as well as data used to display maps on the display screen of the navigation system 11 and road coordinate data that is required for map matching processing which is based on the vehicle's current position. Furthermore, various types of information such as, for example, latitudes and longitudes that show the positions of the intersections, intersection information related to the existence or otherwise of traffic signals and the configuration and intersection angles of roads and the like, information on road types (for example, national roads, provincial roads, local roads and the like), road width information (for example, width data and the like), and road structure information (for example, number of vehicle lanes, forks, merges, and the like) are attached to the nodes and links.

The external sensor 13 includes a pair of cameras that can measure distances to objects present at least in rearward region of a vehicle, and may be positioned at, for example, the lower part of left and right door mirrors 16 (namely, a left door mirror 16L and a right door mirror 16R).

The photographic angle of view of the external sensor 13 that is provided with a pair of cameras composed of, for example, CCD cameras or CMOS cameras or the like that are able to pick up images in the visible light region or the infrared region can be altered by controlling, for example, the display unit 17. The external sensor 13 performs predetermined image processing such as filtering and binarization processing on the respective images that make up the external video images which are obtained by photography over a wide angle that enables at least the rearward region of and the side region of the vehicle to be photographed, or by photography over a narrow angle that enables only the rearward region of the vehicle to be photographed. The external sensor 13 then creates a pair of image data which consists of pixels in a two-dimensional array and outputs these to the display unit 17.

The vehicle state sensor 14 is formed by various sensors that detect various information as vehicle information for the present vehicle. These sensors include, for example, a speed sensor that measures the speed of the present vehicle, a yaw rate sensor that measures the yaw angle (i.e., the turning angle around a vertical axis at the vehicle center of gravity) and the yaw rate (i.e., the turning angle velocity around a vertical axis at the vehicle center of gravity), a steering angle sensor that measures a steering wheel angle (i.e., the direction and the degree of a steering wheel angle input by a driver) and an actual steering angle (i.e., a movement steering angle) that corresponds to the steering wheel angle, a steering wheel torque sensor that measures steering wheel torque, a position sensor that measures the current position and traveling direction of a present vehicle based on measured results of positioning signals such as GPS (global positioning system) signals that are used to measure the position of a vehicle using, for example, artificial satellites, or position signals emitted from information emitting devices located outside the present vehicle, or based on measured results of a suitable gyro sensor and an acceleration sensor, various sensors that measure the on/off state of turn indicator lights and brakes, the accelerator opening degree, and the acceleration in the front-back direction and acceleration in the left-right direction of the present vehicle, and a sensor that measures any pitching of the present vehicle.

Figure 2:
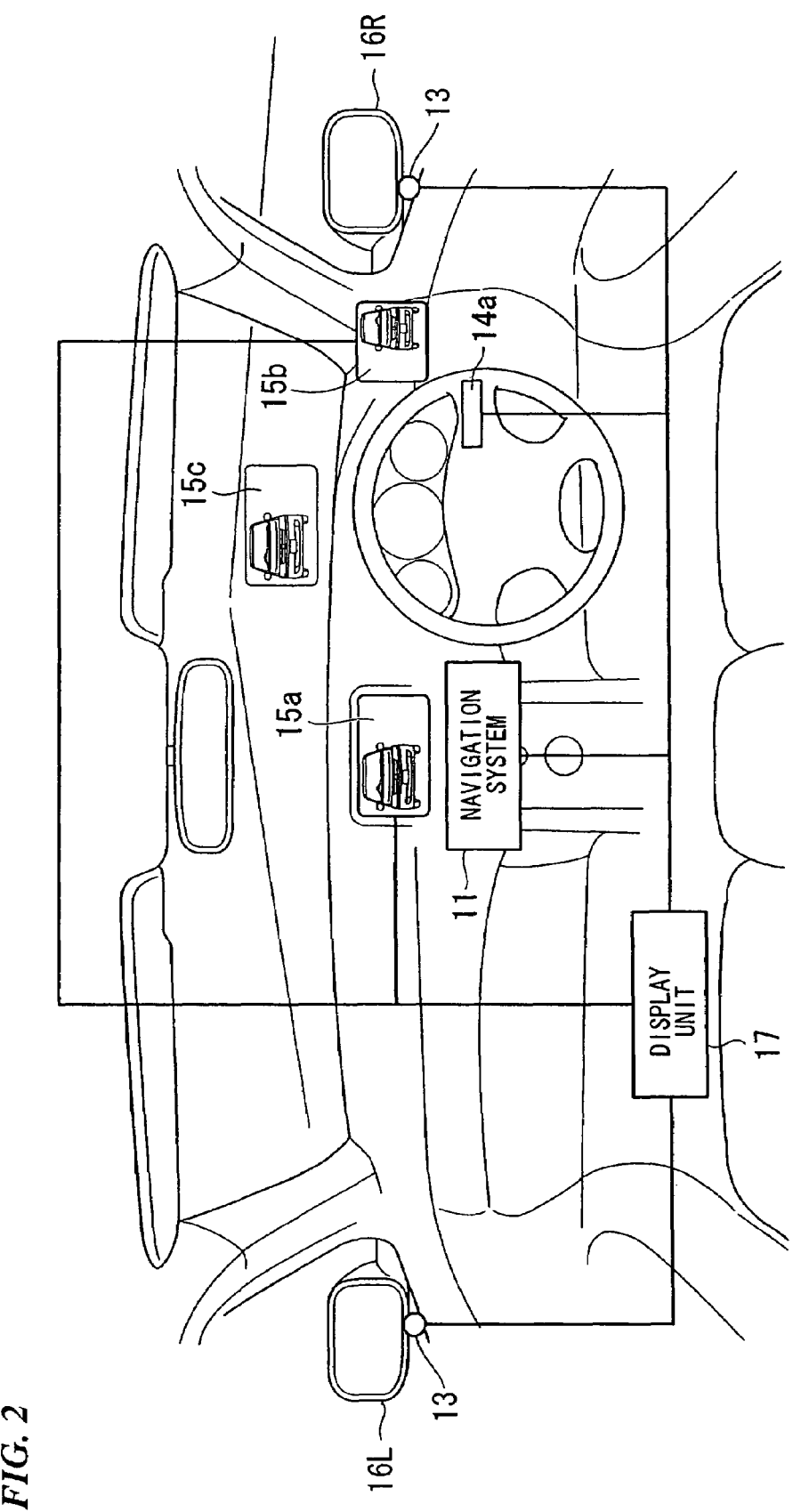
FIG. 2 is a structural view of a monitor of the driving support apparatus according to the embodiment.

As is shown in FIG. 2, for example, the monitor 15 includes a display unit 15a that is installed in the navigation system 1, a display unit 15b that is provided integrally with instruments displaying various traveling quantities of state or is placed adjacent to various instruments, and a head-up display (HUD) 15c that displays various information in the front window so as not to block the forward field of vision of the driver.

For example, image data output from the external sensor 13 that is installed in the left door mirror 16L is displayed on the display unit 15a and the HUD 15c, while image data output from the external sensor 13 that is installed in the right door mirror 16R is displayed on the display unit 15b.

The door mirrors 16 may be, for example, aspherical mirrors that are formed such that the curvature changes continuously from the center portion of the mirror towards the outer circumferential portion thereof. In this case, compared with when, for example, a single spherical mirror is used, the angle of visibility is increased by a factor of 1.4 to 1.7.

Note that the door mirror 16 on the driver's side (for example, the right door mirror 16R) is placed so as to be visible to a driver when the head turn angle of a driver facing forward is, for example, approximately 5°, while the door mirror 16 on the side away from the driver's side (for example, the left door mirror 16L) is placed so as to be visible to a driver when the head turn angle of a driver facing forward is, for example, approximately 30°.

In addition, the viewable range of the door mirror 16 on the driver's side (for example, the right door mirror 16R) is set, for example, at a viewing angle of 34° or the like in accordance with a predetermined eye point of the driver, in which the range that shows the present vehicle itself is set, for example, at a viewing angle of 1 to 2°. Moreover, the viewable range of the door mirror 16 on the side away from the driver's side (for example, the left door mirror 16L) is set, for example, at a viewing angle of 27° or the like in accordance with a predetermined eye point of the driver, in which the range that shows the present vehicle itself is set, for example, at a viewing angle of 1 to 2°.

The display unit 17 includes, for example, an object detection section 32 (object detection device), a mutual relationship calculation section 33, a display determination section 34 (display determination device, intention prediction device), and a display control unit 35 (angle of view adjustment device). As is shown, for example, in FIG. 2, in the monitor 15 that is formed by the display unit 15a that is installed in the navigation system 11, the display unit 15b that is provided integrally with instruments displaying various traveling quantities of state or is placed adjacent to various instruments, and the HUD 15c that displays various information in the front window so as not to block the forward field of vision of the driver, the display unit 17 controls the display angle of view of video images which are obtained through the photography by the external sensor 13, and in these video images performs at least one of displaying an enlargement of, or displaying a highlighting of, or displaying in the center of the screen of the monitor 15, objects that have a possibility of coming into contact with the present vehicle.

When an object (for example, another vehicle) is present that has a possibility of coming into contact with the present vehicle in the rearward region of or in the side region of the present vehicle, the object detection section 32 detects this object and measures the position thereof based, for example, on image data input from the external sensor 13.

The mutual relationship calculation section 33 calculates the relative speed and relative distance between a present vehicle and another vehicle, based on vehicle information about the present vehicle (for example, position and speed and the like) that has been output from the vehicle state sensor 14, and on information about the position of the other vehicle that has been output from the object detection section 32.

Based on the running state of the present vehicle that is determined, for example, from outputs from the vehicle state sensor 14, the display determination section 34 determines whether or not any change should be made for the display angle of view on the monitor 15 of video images obtained through the photography by the external sensor 13.

For example, the display determination section 34 determines the running state of the present vehicle based on the degree of a turn of the present vehicle that is predicted or detected based on outputs from the vehicle state sensor 14. When the degree of the turn is predicted or detected to be large, the display angle of view is set to a wide angle, while when the degree of the turn is predicted or detected to be small, the display angle of view is set to a narrow angle.

When the degree of the turn is predicted or detected to be small, instead of it being determined that the display angle of view is to be set to a narrow angle, it is also possible for a determination to be made to stop the display of image data on the monitor 15.

Note that when a left or right turn or a U-turn of a vehicle is either predicted or detected, the display determination section 34 determines that the degree of the turn is large, while if a lane change or fork or merge of a vehicle is predicted or detected, the display determination section 34 determines that the degree of the turn is small.

The display determination section 34 also determines the running state of a present vehicle based on the speed of the present vehicle that is detected based on outputs from the vehicle state sensor 14. When the speed is slower than a predetermined speed, the display determination section 34 determines that the angle of view is to be set to a wide angle, while if the speed is faster than a predetermined speed, the display determination section 34 determines that the angle of view is to be set to a narrow angle.

Moreover, the display determination section 34 also determines the running state of the present vehicle based on the route of the present vehicle that the navigation system 11 has set based on map data stored in a map data storage device. For example, if the route is one that requires a lane change or a fork or a merge, the display determination section 34 determines that the degree of the turn of the present vehicle is small, while if, for example, the route is one that requires a right turn or a left turn, the display determination section 34 determines that the degree of the turn of the present vehicle is large.

The display determination section 34 also determines the running state of the present vehicle based on the driver's intentions that are predicted based on outputs from the vehicle state sensor 14. For example, when a detection is made by a winker switch 14a that the winker switch 14a has been operated by the driver or by a touch sensor that is provided on a surface of the winker switch 14a that the winker switch 14a has been touched by the driver, the display determination section 34 determines that the driver has an intention of changing lanes, turning left or right, or the like. Alternatively, the display determination section 34 determines that a driver has an intention of executing which one of a lane change, a left or right turn, or the like, based on detection results of the position and speed of the present vehicle and the steering wheel angle or the like.

Furthermore, the display determination section 34 selects at least one of a normal display, an enlarged display, a highlighted display, and a display in the center of the screen of the monitor 15 (i.e., a center display) of a detected object Q, such as is shown in FIGS. 4A to 4D, based on outputs from the object detection section 32, the mutual relationship calculation section 33, and the vehicle state sensor 14 that detects state quantity. Namely, the display determination section 34 makes a determination in order to improve the visibility to the driver of an object that has a possibility of coming into contact with the present vehicle.

Note that the aforementioned highlighted display may be achieved, for example, by displaying a superimposed frame (such as the four-cornered frame F shown in FIG. 4C) such that it surrounds a detected object.

Figure 3A:
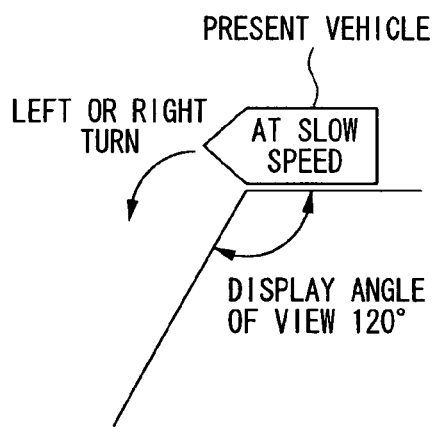
FIGS. 3A to 3C are explanatory views showing examples of a display angle of view of an external sensor and of video images displayed on a monitor according to the embodiment.
Figure 3B:
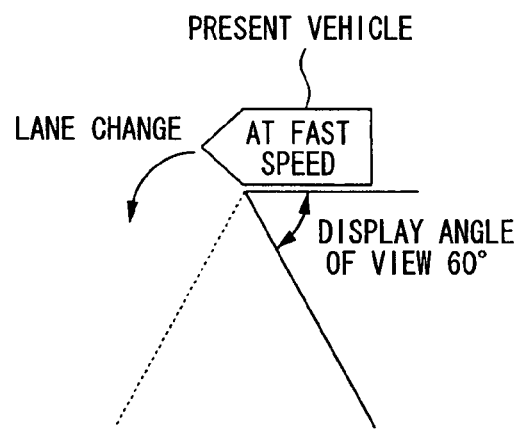
Figure 3C:
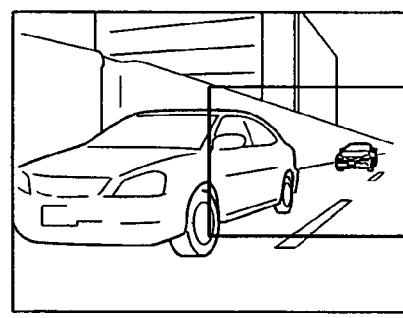
Figure 3C:
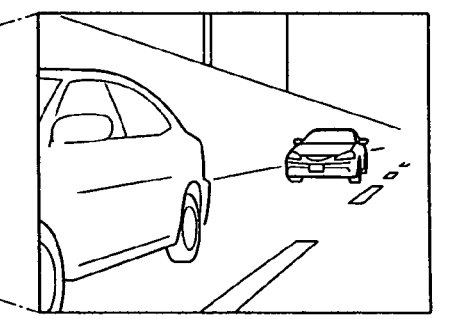
Figure 4A:
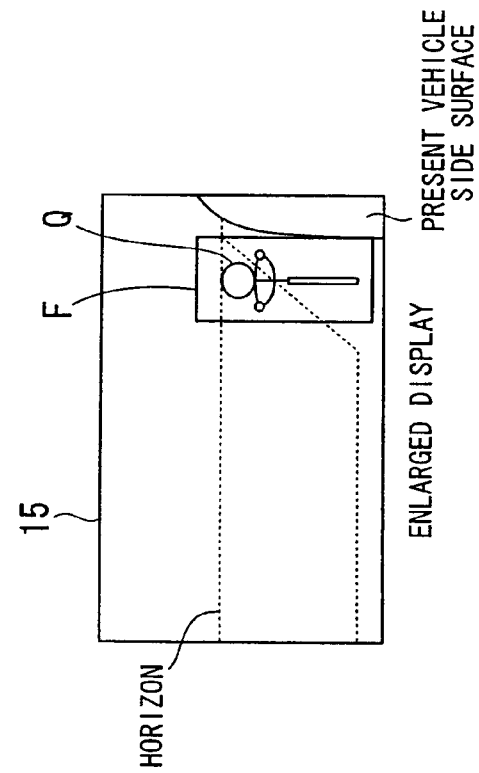
FIGS. 4A to 4D are explanatory views showing examples of video images displayed on a monitor according to the embodiment.
Figure 4C:
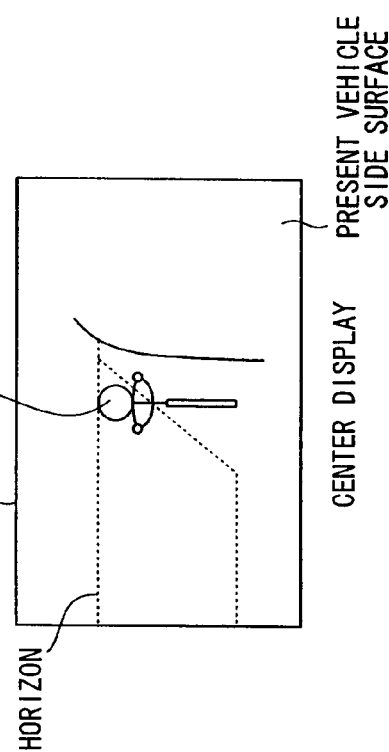
Figure 4B:
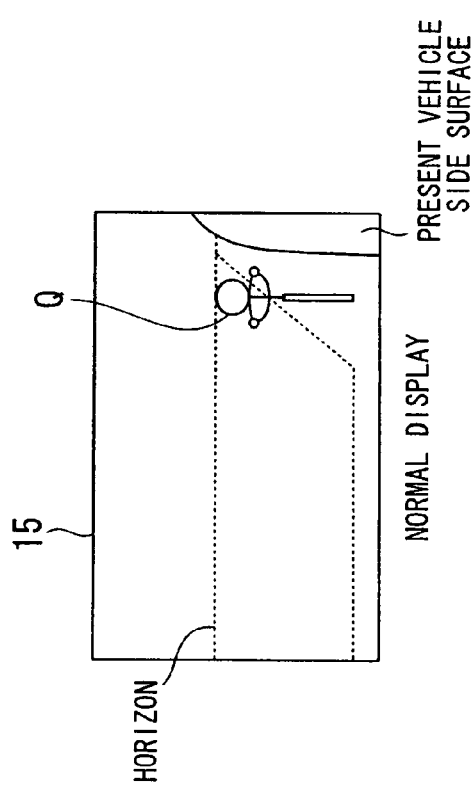
Figure 4D:
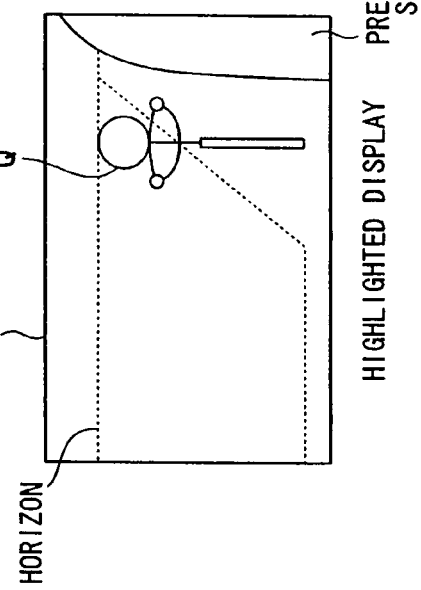

When it has been determined in the display determination section 34 that an alteration of the display angle of view is required, as is shown in FIGS. 3A to 3C, the display control unit 35 performs control to set the photographic angle of view of the external sensor 13 to a wide angle that makes photography possible of at least the side region and the rearward region of the present vehicle (for example, an angle of view of 120° or the like), or to a narrow angle that makes photography possible of only the rearward region of the present vehicle (for example, an angle of view of 60° or the like), and also to display video images on the monitor 15.

Next, an operation of this driving support apparatus 10 will be described.

Firstly, an example of processing to switch the display angle of view in accordance with the speed of the present vehicle will be described.

Figure 5:
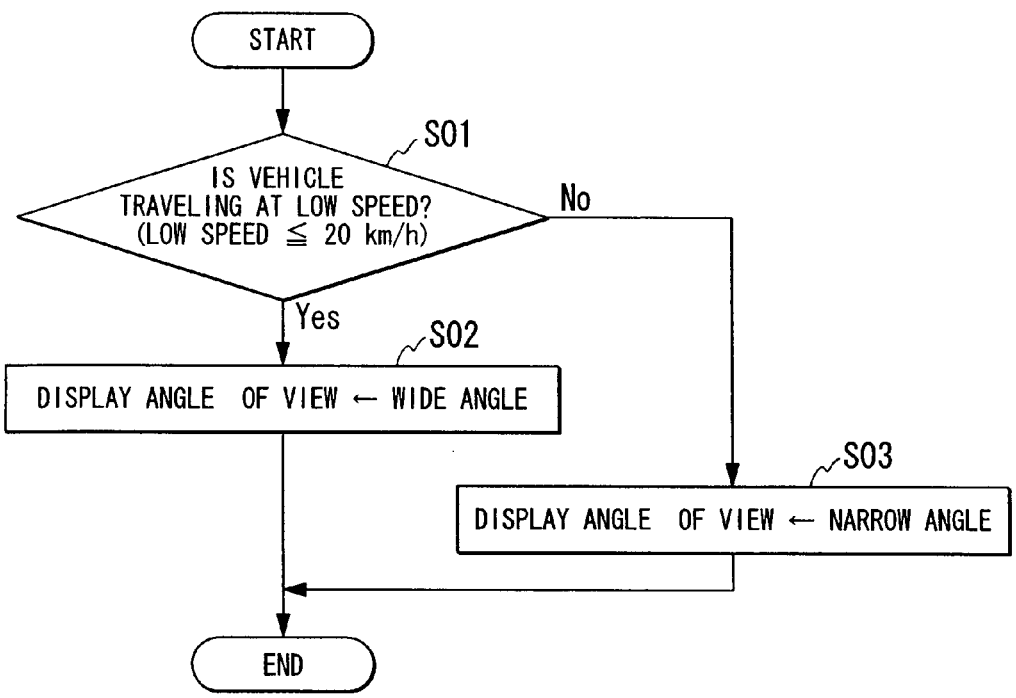
FIG. 5 is a flowchart showing operations of a driving support apparatus according to the embodiment.

In step S01 shown in FIG. 5, it is determined whether or not the speed of the present vehicle is equal to or less than a predetermined speed (for example, 20 km/h or the like).

If the result of this determination is YES, then in the subsequent step S02 the display angle of view is set to a wide angle and the processing sequence is ended.

If, however, the result of this determination is NO, then in the subsequent step S03 the display angle of view is set to a narrow angle and the processing sequence is ended.

Next, an example of processing to switch the display angle of view in accordance with the route that has been set in the route guidance of the present vehicle will be described.

Figure 6:
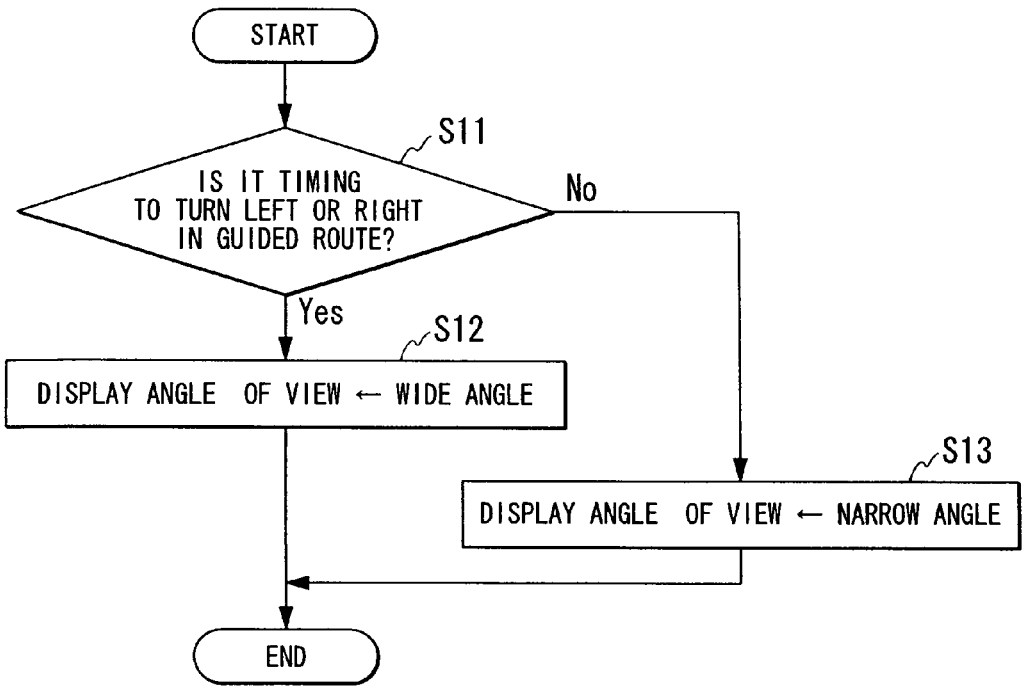
FIG. 6 is a flowchart showing operations of a driving support apparatus according to the embodiment.

In step S11 shown in FIG. 6, it is determined whether or not the position of the present vehicle on the guided route that has been set in the navigation system 11 is a position that corresponds to the timing for executing a right turn or a left turn.

If the result of this determination is YES, then it is determined that the vehicle is making a relatively large turning movement, and in the subsequent step S12, the display angle of view is set to a wide angle, and the processing sequence is ended.

If, however, the result of this determination is NO, then it is determined that the vehicle is making a relatively small turning movement, and in the subsequent step S13, the display angle of view is set to a narrow angle, and the processing sequence is ended.

Note that it is also possible for the determination as to whether or not image data output from the external sensor 13 is to be displayed on the monitor 15 to be made, for example, in accordance with operating state of the navigation system 11. Alternatively, it is also possible for image data to be displayed constantly on the monitor 15.

An example of processing to control the display on the monitor 15 based on the driving intentions of the driver will be described.

Figure 7:
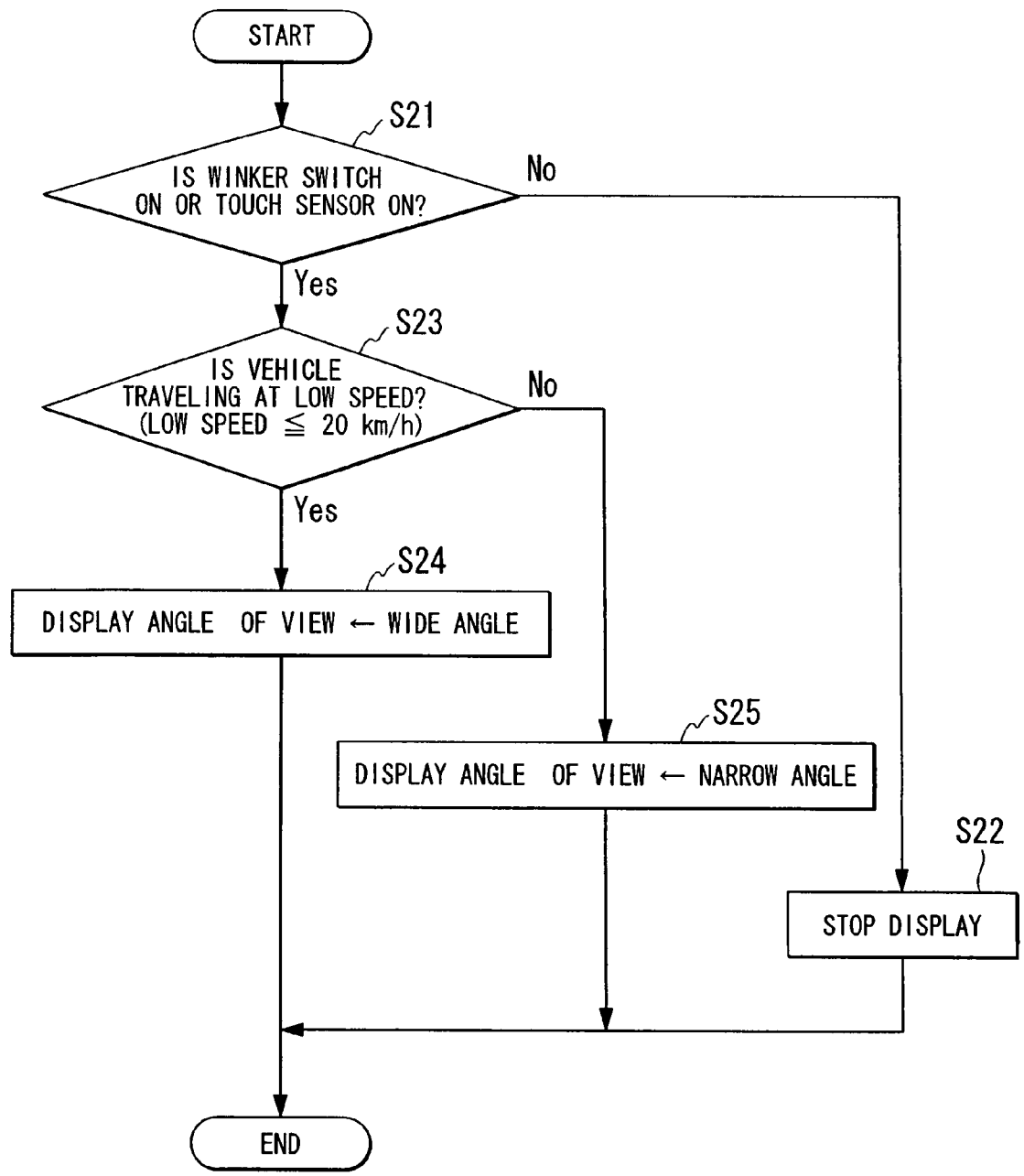
FIG. 7 is a flowchart showing operations of a driving support apparatus according to the embodiment.

In step S21 shown in FIG. 7, whether or not contact has been made with a winker switch 14a by the driver, or whether or not the winker switch 14a has been operated by the driver is detected by the touch sensor provided on the surface of the winker switch 14a.

If the result of this determination is NO, then it is determined that the driver has no intention of making either one of a relatively large turning movement such as a right or left turn, and a relatively small turning movement such as a lane change, and in the subsequent step S22 the display on the monitor 15 is stopped and the processing sequence is ended.

If, however, the result of this determination is YES, then it is determined in the subsequent step S23 whether or not the speed of the vehicle is equal to or less than a predetermined speed (for example, 20 km/h or the like).

If the result of this determination is YES, then it is determined that there is a strong possibility that a relatively large turning movement such as a right or left turn is being made, and in the subsequent step S24 the display angle of view is set to a wide angle, and the processing sequence is ended.

If, however, the result of this determination is NO, then in step S25, the display angle of view is set to a narrow angle and the processing sequence is ended.

As has been described above, according to the driving support apparatus 10 for a vehicle of the present embodiment, by changing on the monitor 15 the display angle of view of video images obtained through the photography by the external sensor 13 which is able to photograph side region of and rearward region of a present vehicle in accordance with the running state of the present vehicle, it is possible to set the quantity of external information that is required for a driving operation at a suitable quantity, and it is possible to prevent superfluous information being supplied unnecessarily to a driver, and prevent information for a driver to be insufficient.

Moreover, when an object that has a possibility of coming into contact with a present vehicle is detected in the side region of or in the rearward region of the present vehicle, by displaying this detected object on the monitor 15 in order to improve the viewing ability of a driver, an object (for example, another vehicle) to the sides of or behind a vehicle can be made easily visible to the driver.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A driving support apparatus comprising:
   an image sensing device that photographs side region of a vehicle and rearward region of a vehicle while altering an angle of view, said image sensing device including only two cameras disposed respectively on opposite sides of said vehicle;
   a display unit that displays video images photographed by the image sensing device so as to be visible to a driver of the vehicle;
   a display determination device that determines a running state of the vehicle, and determines whether or not an alteration of the angle of view is required; and
   an angle of view adjustment device that switches the angle of view of the image sensing device, in accordance with a determination of the display determination device, between either one of a wide angle that enables the side region and the rearward region to be photographed, and a narrow angle that only allows the rearward region to be photographed.

2. The driving support apparatus according to claim 1, wherein
the display determination device determines the running state based on the degree of a turn of the vehicle, that is predicted or detected, and
the angle of view adjustment device sets the angle of view to a wide angle when the degree of the turn is determined by the display determination device to be large.

3. The driving support apparatus according to claim 1, wherein
the display determination device determines the running state based on the degree of a turn of the vehicle, that is predicted or detected, and
the angle of view adjustment device sets the angle of view to a narrow angle when the degree of the turn is determined by the display determination device to be small.

4. The driving support apparatus according to claim 2, wherein
the display determination device determines that the degree of the turn is large when a left or right turn or a U-turn of the vehicle is predicted or detected.

5. The driving support apparatus according to claim 3, wherein
the display determination device determines that the degree of the turn is small when a lane change or fork or merge of the vehicle is predicted or detected.

6. The driving support apparatus according to claim 1, further comprising a speed measuring device that measures a speed of the vehicle, wherein
the display determination device determines the running state based on the speed that is measured by the speed measuring device.

7. The driving support apparatus according to claim 6, wherein
the angle of view adjustment device sets the angle of view to the wide angle when the speed is less than a predetermined speed.

8. The driving support apparatus according to claim 6, wherein
the angle of view adjustment device sets the angle of view to the narrow angle when the speed is greater than a predetermined speed.

9. The driving support apparatus according to claim 1, further comprising road map data; and a route setting device that sets a route of the vehicle based on the road map data, wherein
the display determination device determines the running state based on the route that is set by the route setting device.

10. The driving support apparatus according to claim 1, further comprising an intention prediction device that predicts a driving intention of the driver of the vehicle, wherein
the display determination device determines the running state based on the driving intention that is predicted by the intention prediction device.

11. The driving support apparatus according to claim 1, further comprising an object detection device that detects an object that has a possibility of coming into contact with the vehicle in the video images photographed by the image sensing device, wherein
the display unit provides a display that enables the visibility of the object detected by the object detecting device to be improved.

12. The driving support apparatus according to claim 11, wherein
the display unit improves the visibility of the object by performing at least one of an enlarged display, a highlighted display, and a display in the center of the display unit, of the object.

13. The driving support apparatus according to claim 1, wherein
the display determination device determines the running state of the vehicle using preexisting data from a global positioning system and road map data.

14. The driving support apparatus according to claim 1, wherein
one of the two cameras of the image sensing device is disposed with a driver's side door rear view mirror and the other of said two cameras is disposed with a passenger's side door rear view mirror.

15. The driving support apparatus according to claim 1, wherein
the display unit includes three monitors, wherein two of the monitors display the image taken from a camera located on a driver's side of the vehicle and the third monitor displays the image taken from a camera located on a passenger's side of the vehicle.

16. The driving support apparatus according to claim 15, wherein one of the two cameras of the image sensing device is disposed with a driver's side door rear view mirror and the other of said two cameras is disposed with a passenger's side door rear view mirror, and the two monitors displaying the image from the camera disposed with a driver's side door rear view mirror include a side display unit and a heads-up display unit.

* * * * *